(12) United States Patent
Fujioka et al.

(10) Patent No.: US 10,640,392 B2
(45) Date of Patent: May 5, 2020

(54) WATER QUALITY MANAGEMENT DEVICE, WATER TREATMENT SYSTEM, WATER QUALITY MANAGEMENT METHOD, AND PROGRAM FOR OPTIMIZING WATER TREATMENT SYSTEM

(71) Applicant: Mitsubishi Hitachi Power Systems, Ltd., Kanagawa (JP)

(72) Inventors: Masanori Fujioka, Yokohama (JP); Toru Tanaka, Yokohama (JP); Akihiro Hamasaki, Yokohama (JP); Atsushi Sugimoto, Yokohama (JP); Mayumi Saito, Tokyo (JP); Yoshiyuki Hamaji, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 117 days.

(21) Appl. No.: 15/758,860

(22) PCT Filed: Jun. 27, 2016

(86) PCT No.: PCT/JP2016/068994
§ 371 (c)(1),
(2) Date: Mar. 9, 2018

(87) PCT Pub. No.: WO2017/047193
PCT Pub. Date: Mar. 23, 2017

(65) Prior Publication Data
US 2018/0282180 A1    Oct. 4, 2018

(30) Foreign Application Priority Data

Sep. 18, 2015    (JP) .................................. 2015-184964

(51) Int. Cl.
*C02F 1/66* (2006.01)
*C02F 1/68* (2006.01)
(Continued)

(52) U.S. Cl.
CPC .............. *C02F 1/008* (2013.01); *C02F 1/685* (2013.01); *C02F 1/686* (2013.01); *F22D 11/00* (2013.01);
(Continued)

(58) Field of Classification Search
CPC .. C02F 1/008; C02F 1/66; C02F 1/685; C02F 1/686; C02F 5/08; C02F 2103/023;
(Continued)

(56) References Cited

U.S. PATENT DOCUMENTS 4,830,757 A * 5/1989 Lynch .................... G01N 33/18
                                                    210/104
5,191,638 A * 3/1993 Wakami ................ G06N 5/048
                                                    706/10
(Continued)

FOREIGN PATENT DOCUMENTS

FR    2996546      4/2014
JP    57-3875      1/1982
(Continued)

OTHER PUBLICATIONS

Kim et al, Soft Sensor Using PNN Model and Rule Base for Wastewater Treatment Plant, International Syposium on Neural Networks, ISNN, 2006. (Year: 2006).*
(Continued)

*Primary Examiner* — Joseph W Drodge
(74) *Attorney, Agent, or Firm* — Wenderoth, Lind & Ponack, L.L.P.

(57) ABSTRACT

A water quality management device is provided with a water quality index value acquisition unit which acquires water quality index values including a makeup water quality index value indicating water quality of makeup water and a circulating water quality index value indicating water quality of circulating water, and a determining unit which
(Continued)

determines an amount of concentration control associated with a concentration rate of a circulating water system based on the water quality index values acquired by the water quality index value acquisition unit.

8 Claims, 5 Drawing Sheets

(51) Int. Cl.
    *C02F 5/08*     (2006.01)
    *F22D 11/02*     (2006.01)
    *F28G 13/00*     (2006.01)
    *C02F 1/00*     (2006.01)
    *G05B 13/02*     (2006.01)
    *F22D 11/00*     (2006.01)
    *C02F 103/02*     (2006.01)

(52) U.S. Cl.
    CPC ............ *F22D 11/006* (2013.01); *F22D 11/02* (2013.01); *G05B 13/0265* (2013.01); *C02F 1/66* (2013.01); *C02F 5/08* (2013.01); *C02F 2103/023* (2013.01); *C02F 2209/006* (2013.01); *C02F 2209/40* (2013.01); *C02F 2301/04* (2013.01); *C02F 2303/08* (2013.01); *C02F 2303/20* (2013.01); *C02F 2303/22* (2013.01); *F28G 13/00* (2013.01)

(58) Field of Classification Search
    CPC .......... C02F 2209/001; C02F 2209/005; C02F 2209/006; C02F 2209/05; C02F 2209/40; C02F 2303/08; C02F 2303/20; C02F 2303/22; F22D 11/006; F22D 11/02; F22D 11/06; F22D 11/00; G05B 13/0265; F28G 13/00; B01F 15/00123; B01F 15/0408; B01F 15/0458; B01F 15/00; B01F 15/123
    USPC ........ 210/696, 739, 749, 752, 85, 96.1, 143, 210/198.1, 199; 137/2, 3, 5, 88, 93; 700/28, 44, 46, 47, 266, 273, 276, 282, 700/285; 366/151.1, 152.1
See application file for complete search history.

(56) References Cited

U.S. PATENT DOCUMENTS

| | | | | |
|---|---|---|---|---|
| 5,342,510 A * | 8/1994 | Eden | .................... | B01J 19/0006 204/433 |
| 5,774,633 A | 6/1998 | Baba et al. | | |
| 5,822,220 A * | 10/1998 | Baines | ............... | D21C 11/0064 700/266 |
| 5,855,791 A * | 1/1999 | Hays | ....................... | C02F 1/008 137/3 |
| 5,895,565 A * | 4/1999 | Steininger | ............... | C02F 1/008 210/149 |
| 5,993,194 A * | 11/1999 | Lemelson | ............... | F23N 5/082 356/418 |
| 6,303,027 B1 * | 10/2001 | Nagaiwa | ................. | C02F 3/006 210/143 |
| 6,535,795 B1 * | 3/2003 | Schroeder | ............ | G05B 13/029 210/143 |
| 6,633,782 B1 * | 10/2003 | Schleiss | ............. | G05B 23/0229 700/18 |
| 6,716,359 B1 * | 4/2004 | Dennis, II | ............. | G05D 21/02 210/143 |
| 2001/0014436 A1 * | 8/2001 | Lemelson | ............... | F23N 1/022 431/12 |
| 2004/0011066 A1 * | 1/2004 | Sugihara | .................. | F24F 11/30 62/177 |
| 2005/0192680 A1 * | 9/2005 | Cascia | ................. | G05B 13/027 700/29 |
| 2006/0143143 A1 * | 6/2006 | Chan | ........................ | G06N 5/02 706/47 |
| 2006/0241907 A1 * | 10/2006 | Armstrong | ......... | G05B 23/0218 702/182 |
| 2010/0163469 A1 * | 7/2010 | Wan | ....................... | G05D 21/02 210/96.1 |
| 2011/0211975 A1 * | 9/2011 | Magoon | .................. | F04B 39/16 417/53 |
| 2011/0264282 A1 * | 10/2011 | Blank | ..................... | G05B 15/02 700/282 |
| 2013/0062288 A1 * | 3/2013 | Spani | ........................ | E03F 5/14 210/709 |
| 2014/0311350 A1 * | 10/2014 | Campbell | .......... | G01N 21/7703 96/417 |
| 2018/0282180 A1 * | 10/2018 | Fujioka | ................. | F22D 11/006 |

FOREIGN PATENT DOCUMENTS

| | | |
|---|---|---|
| JP | 2004-283755 | 10/2004 |
| JP | 2010-247063 | 11/2010 |
| WO | WO2014157750 | * 2/2014 ............ G06F 19/00 |

OTHER PUBLICATIONS

Kim et al, WIPO Translated Abstract for Publication WO 2014/0157750, Feb. 2014. (Year: 2014).*

International Search Report dated Jul. 19, 2016 in International (PCT) Application No. PCT/JP2016/068994, with English translation.

Written Opinion of the International Searching Authority dated Jul. 19, 2016 in International (PCT) Application No. PCT/JP2016/068994, with English translation.

* cited by examiner

WATER QUALITY MANAGEMENT DEVICE, WATER TREATMENT SYSTEM, WATER QUALITY MANAGEMENT METHOD, AND PROGRAM FOR OPTIMIZING WATER TREATMENT SYSTEM

TECHNICAL FIELD

The present invention relates to a water quality management device, a water treatment system, a water quality management method, and a program for optimizing a water treatment system.

BACKGROUND ART

Cooling water systems which circulate cooling water for cooling steam discharged from a steam turbine are provided in thermal power plants in some cases. The cooling water system includes a condenser which cools steam and a cooling tower which cools cooling water heated in the condenser. There is a need to constantly supply makeup water to the cooling water system because cooling water is evaporated in the atmosphere in the cooling tower. Substances which cause deterioration of the cooling water system can be included in the makeup water. Examples of the substances which cause deterioration include salts which can cause corrosion or be converted into evaporation residues and silica which can cause scale. A certain amount of cooling water is discharged, and a certain amount of chemicals are injected not to deteriorate the cooling water system.

Patent Literature 1 discloses a method of blowing (discharging) circulating cooling water and injecting makeup water when electrical conductivity of the cooling water is higher than a set value, and stopping the blowing when the electrical conductivity of the cooling water is lower than the set value, as a method of controlling chemical injection in conjunction with an amount of makeup water.

CITATION LIST

Patent Literature

[Patent Literature 1]
Japanese Examined Patent Application Second Publication No. S57-3875

SUMMARY OF INVENTION

Technical Problem

However, when water quality of makeup water is not constant, the method disclosed in Patent Literature 1 may fail to appropriately manage the water quality of a cooling water system. For example, raw water acquired from groundwater or surface water is known as varying in water quality. For this reason, when raw water is used as makeup water, there is a need to determine a target value of a concentration rate of cooling water using water quality of the makeup water in the worst state as a reference and perform control. There is a plurality of variables which define the water quality of the makeup water. The target value of the concentration rate is changed according to a combination of the plurality of variables. When the target value of the concentration rate of the cooling water is not changed even if the water quality of the raw water is changed, despite an operation at a higher concentration rate being possible, the water quality is managed at a low concentration rate. For this reason, a chemical is injected into the cooling water system more than necessary, and water quality management cost cannot thus be suppressed.

There is also a technical problem in a conventional control system which defines an amount of blowing using electrical conductivity because errors occur in an electrical conductivity meter which has been operated for a long time, and thus it is difficult to ascertain a correct value if calibration is not frequently performed.

An object of the present invention is to provide a water quality management device, a water treatment system, a water quality management method, and a program for optimizing a water treatment system which appropriately manage water quality of a circulating water system even if water quality of makeup water is not constant.

Solution to Problem

According to a first aspect of the present invention, a water quality management device is a water quality management device which manages a circulating water system of a plant including a circulation line through which circulating water is circulated, a supply line which supplies makeup water to the circulation line, a discharge line which discharges the circulating water from the circulation line, and a chemical injection line which injects a chemical to the circulation line, the water quality management device including: a determining unit configured to determine an amount of concentration control associated with a concentration rate of the circulating water system; an acquisition unit configured to acquire plant data on the plant used by the determining unit to determine the amount of concentration control, a relational storage unit configured to store an inference rule associating a condition of the plant data and an amount of concentration control of when the condition is satisfied with each other; an input unit configured to receive an input of an amount of concentration control which satisfies a predetermined limit value and is specified based on the plant data acquired by the acquisition unit; and an updating unit configured to generate a new inference rule based on the amount of concentration control input to the input unit and record the new inference rule on the relational storage unit, wherein the determining unit determines an amount of concentration control based on the plant data acquired by the acquisition unit and the inference rule stored in the relational storage unit.

According to a second aspect of the present invention, the water quality management device according to the first aspect may further include a relational storage unit configured to store a relationship between the plant data and the amount of concentration control, wherein the determining unit may determine an amount of concentration control based on the plant data acquired by the acquisition unit and the relationship stored by the relational storage unit.

According to a third aspect of the present invention, the water quality management device according to the first or second aspect may further include a controller configured to control at least one of the amount of makeup water supplied to the supply line, the amount of circulating water discharged from the discharge line, and the amount of chemical injected to the circulation line based on the amount of concentration control determined by the determining unit.

According to a fourth aspect of the present invention, in the water quality management device according to the first aspect, the acquisition unit may include a water quality index value acquisition unit which acquires water quality index values including a makeup water quality index value indicating water quality of the makeup water and a circulating water quality index value indicating water quality of the circulating water, and the determining unit may determine the amount of concentration control based on the water quality index values acquired by the water quality index value acquisition unit.

According to a fifth aspect of the present invention, in the water quality management device according to the fourth aspect, the water quality index values may include a discharge water quality index value indicating water quality of the circulating water discharged from the discharge line.

According to a sixth aspect of the present invention, in the water quality management device according to the first aspect, the acquisition unit may include an environmental data acquisition unit which acquires environmental data of a plant, and the determining unit may determine the amount of concentration control based on the environmental data acquired by the environmental data acquisition unit.

According to a seventh aspect of the present invention, in the water quality management device according to the first aspect, the acquisition unit may include an operating data acquisition unit which acquires operating data of a plant, and the determining unit may determine the amount of concentration based on the operating data acquired by the operating data acquisition unit.

According to an eighth aspect of the present invention, a water treatment system includes: a circulating water system including a circulation line through which circulating water is circulated, a supply line which supplies makeup water to the circulation line, a discharge line which discharges the circulating water from the circulation line, and a chemical injection line which injects a chemical to the circulation line; and the water quality management device according to any one of the first to seventh aspects.

According to a ninth aspect of the present invention, a water quality management method is a water quality management method of a circulating water system of a plant including a circulation line through which circulating water is circulated, a supply line which supplies makeup water to the circulation line, a discharge line which discharges the circulating water from the circulation line, and a chemical injection line which injects a chemical to the circulation line, the water quality management method including: an acquisition step of acquiring plant data on the plant; an input step of receiving an input of an amount of concentration control which satisfies a predetermined limit value and is specified based on the acquired plant data; an updating step of generating a new inference rule based on the input amount of concentration control and storing the new inference rule in a relational storage unit which stores an inference rule associating a condition of the plant data and an amount of concentration control of when the condition is satisfied with each other; and a determination step of determining an amount of concentration control based on the plant data acquired in the acquisition step and the inference rule stored by the relational storage unit.

According to a tenth aspect of the present invention, a program for optimizing a water treatment system causes a computer of a water quality management device which manages a circulating water system of a plant including a circulation line through which circulating water is circulated, a supply line which supplies makeup water to the circulation line, a discharge line which discharges the circulating water from the circulation line, and a chemical injection line which injects a chemical to the circulation line, to function as: an acquisition unit configured to acquire plant data on the plant; a determining unit configured to determine an amount of concentration control based on the plant data acquired by the acquisition unit; a relational storage unit configured to store an inference rule associating a condition of the plant data and an amount of concentration control of when the condition is satisfied with each other; an input unit configured to receive an input of an amount of concentration control which satisfies a predetermined limit value and is specified based on the plant data acquired by the acquisition unit; and an updating unit configured to generate a new inference rule based on the amount of concentration control input to the input unit and record the new inference rule on the relational storage unit, wherein the determining unit determines an amount of concentration control based on the plant data acquired by the acquisition unit and the inference rule stored by the relational storage unit.

Advantageous Effects of Invention

According to at least one aspect of the above-described aspects, the water quality management device determines an amount of concentration control based on a makeup water quality index value indicating water quality of makeup water in addition to a circulating water quality index value indicating water quality of circulating water circulating through a circulation line. Thus, the water quality management device can appropriately manage water quality of a circulating water system even if the water quality of the makeup water is not constant.

DESCRIPTION OF EMBODIMENTS

First Embodiments

Hereinafter, embodiments will be described in detail with reference to the accompanying drawings.

Figure 1:
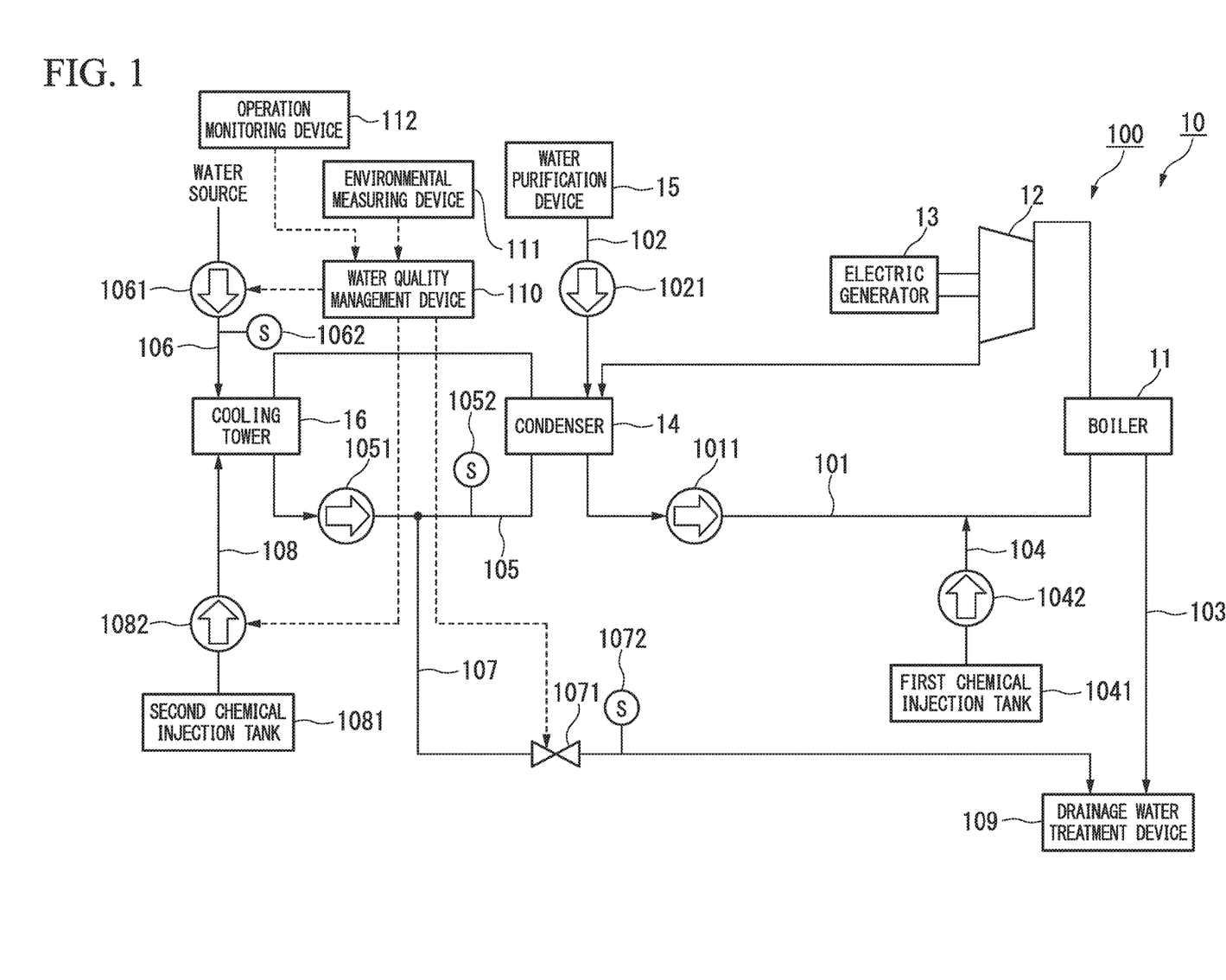
FIG. 1 is a schematic block diagram showing a constitution of a water treatment system according to a first embodiment.

FIG. 1 is a schematic block diagram showing a constitution of a water treatment system according to a first embodiment.

A water treatment system 100 according to this embodiment is provided for a power generating plant 10. The power generating plant 10 includes a boiler 11, a steam turbine 12, an electric generator 13, a condenser 14, a water purification device 15, and a cooling tower 16.

The boiler 11 generates steam by evaporating water. The steam turbine 12 is rotated using the steam generated by the boiler 11. The electric generator 13 converts rotational energy of the steam turbine 12 into electric power. The condenser 14 heat-exchanges steam discharged from the steam turbine 12 with cooling water to convert the steam into water. The water purification device 15 generates pure water. The cooling tower 16 cools the cooling water heat-exchanged by the condenser 14. The cooling tower 16 is provided with fans (not shown) configured to cool the cooling water. The fans are configured such that rotational speeds thereof can be controlled by inverter control or by controlling the number of fans to be operated.

The water treatment system 100 includes a steam circulation line 101, a first supply line 102, a first drainage line 103, a first chemical injection line 104, a cooling water circulation line 105, a second supply line 106, a second drainage line 107, a second chemical injection line 108, a drainage water treatment device 109, a water quality management device 110, and an environmental measuring device 111.

The steam circulation line 101 is a line through which water and steam are circulated to the steam turbine 12, the condenser 14, and the boiler 11. A first feed pump 1011 is provided between the condenser 14 and the boiler 11 in the steam circulation line 101. The first feed pump 1011 pumps the water horn the condenser 14 toward the boiler 11.

The first supply line 102 is a line which supplies the pure water generated by the water purification device 15 to the steam circulation line 101. The first supply line 102 is provided with a second feed pump 1021. The second feed pump 1021 is used when the condenser 14 is filled with water. Water within the first supply line 102 is pumped from the water purification device 15 toward the condenser 14 due to decompression of the condenser 14 during operation.

The first drainage line 103 is a line which discharges a portion of water circulating through the steam circulation line 101 from the boiler 11 to the drainage water treatment device 109.

The first chemical injection line 104 is a line which supplies a pH adjusting agent, a deoxidizer, or another chemical to the steam circulation line 101. The first chemical injection line 104 includes a first chemical injection tank 1041 which stores a chemical and a first chemical injection pump 1042 which supplies the chemical from the first chemical injection tank 1041 to the steam circulation line 101.

A circulating water system is constituted by the steam circulation line 101, the first supply line 102, the first drainage line 103, and the first chemical injection line 104.

The cooling water circulation line 105 is a line through which cooling water is circulated to the condenser 14 and the cooling tower 16. The cooling water circulation line 105 is provided with a third feed pump 1051 and a circulating water quality sensor 1052. The third feed pump 1051 pumps the cooling water from the cooling tower 16 toward the condenser 14. The circulating water quality sensor 1052 detects water quality of the cooling water circulating through the cooling water circulation line 105. Examples of the water quality detected by the sensor include electrical conductivity, a pH value, a concentration of a salt, a concentration of a metal, chemical oxygen demand (COD), biochemical oxygen demand (BOD), a concentration of silica, and a combination thereof. The circulating water quality sensor 1052 outputs a circulating water quality index value indicating the detected water quality to the water quality management device 110.

The second supply line 106 is a line which supplies raw water acquired from a water source as makeup water to the cooling water circulation line 105. The second supply line 106 is provided with a fourth feed pump 1061 and a makeup water quality sensor 1062. The fourth feed pump 1061 pumps the makeup water from the water source toward the cooling tower 16. The makeup water quality sensor 1062 outputs a makeup water quality index value indicating detected water quality to the water quality management device 110.

The second drainage line 107 is a line which discharges a portion of water circulating through the cooling water circulation line 105 to the drainage water treatment device 109. The second drainage line 107 is provided with a blowdown valve 1071 and a drainage water quality sensor 1072. The blowdown valve 1071 limits an amount of drainage water which is blown from the cooling water circulation line 105 to the drainage water treatment device 109. The drainage water quality sensor 1072 detects the water quality of drainage water discharged from the second drainage line 107. The drainage water quality sensor 1072 outputs a drainage water quality index value indicating the detected water quality to the water quality management device 110.

The second chemical injection line 108 is a line which supplies a corrosion inhibitor, a scale inhibitor, a slime control agent, a pH adjusting agent, or another chemical to the cooling water circulation line 105. The second chemical injection line 108 includes a second chemical injection tank 1081 which stores a chemical and a second chemical injection pump 1082 which supplies the chemical from the second chemical injection tank 1081 to the cooling water circulation line 105.

The circulating water system is constituted by the cooling water circulation line 105, the second supply line 106, the second drainage line 107, and the second chemical injection line 108.

The drainage water treatment device 109 injects an acid, an alkali, a flocculant, or another chemical into drainage water discharged from the first drainage line 103 and the second drainage line 107. The drainage water treatment device 109 discards drainage water treated by a chemical.

The water quality management device 110 determines power of the fourth feed pump 1061, an opening degree of the blowdown valve 1071, and an amount of injection of the second chemical injection pump 1082 (an amount of stroke or the number of strokes of a plunger) based on the water quality detected by the circulating water quality sensor 1052, the water quality detected by the makeup water quality sensor 1062, the water quality detected by the drainage water quality sensor 1072, and environmental data in the periphery of the power generating plant 10 measured by the environmental measuring device 111.

The environmental measuring device 111 measures the environment in the periphery of the power generating plant 10 and generates the environmental data. Examples of environmental data include weather, a temperature, a humidity, and water quality (a turbidity level or the like) of makeup water in a surrounding region of the power generating plant 10.

An operation monitoring device 112 measures operating data of the power generating plant 10 and generates the operating data. Examples of the operating data include an output of the power generating plant 10, various flow rates (of steam, water, cooling water, a chemical, and the like), a temperature or a pressure of a boiler, a temperature of cooling water, an air volume of a cooling tower, and the like.

Figure 2:
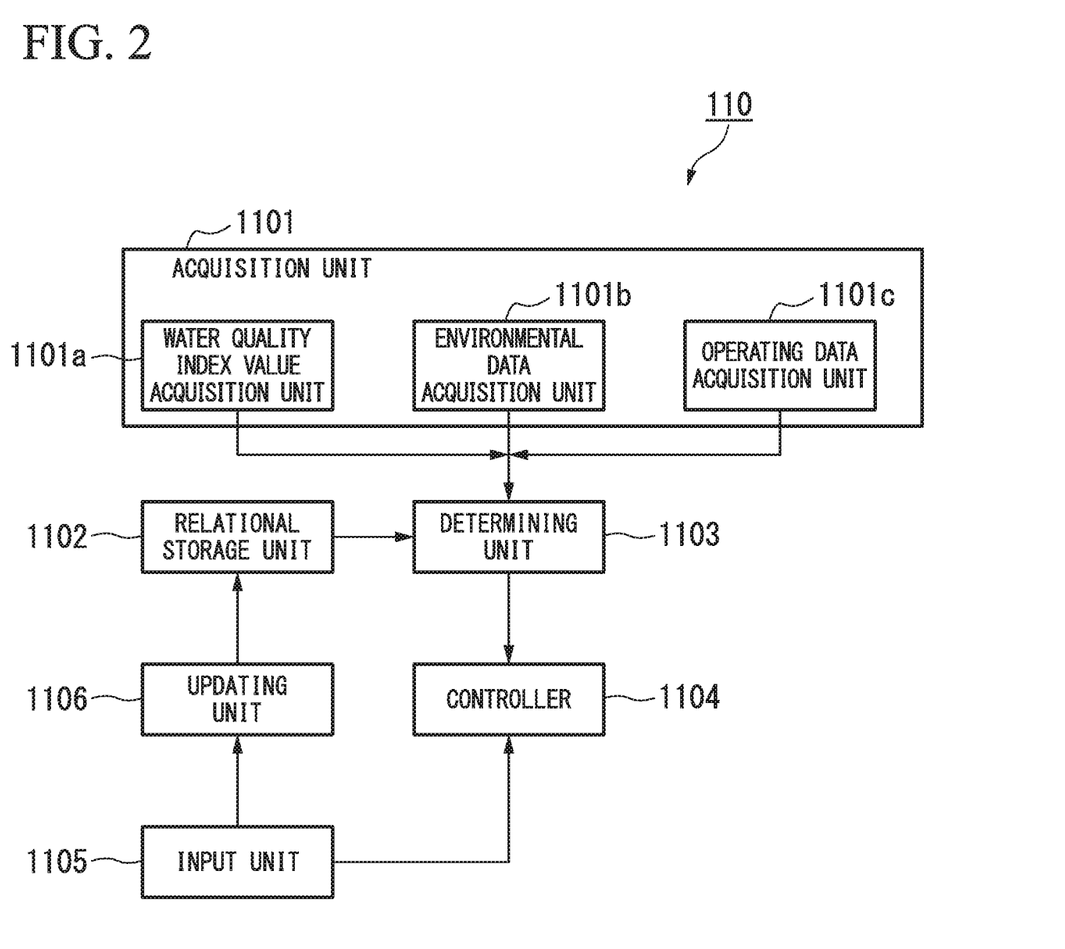
FIG. 2 is a schematic block diagram showing a software constitution of the water quality management device according to the first embodiment.

FIG. 2 is a schematic block diagram showing a software constitution of the water quality management device according to the first embodiment.

The water quality management device 110 includes an acquisition unit 1101, a water quality index value acquisition unit 1101*a*, an environmental data acquisition unit 1101*b*, an operating data acquisition unit 1101*c*, a relational storage unit 1102, a determining unit 1103, a controller 1104, an input unit 1105, and an updating unit 1106.

The acquisition unit 1101 acquires plant data on the power generating plant 10. To be specific, the acquisition unit 1101 includes the water quality index value acquisition unit 1101a, the environmental data acquisition unit 1101b, and the operating data acquisition unit 1101c.

The water quality index value acquisition unit 1101a acquires the water quality index values indicating the water quality as the plant data from the circulating water quality sensor 1052, the makeup water quality sensor 1062, and the drainage water quality sensor 1072. The water quality index value acquisition unit 1101a acquires the circulating water quality index value from the circulating water quality sensor 1052. The water quality index value acquisition unit 1101a acquires the makeup water quality index value from the makeup water quality sensor 1062. The water quality index value acquisition unit 1101a acquires the drainage water quality index value from the drainage water quality sensor 1072.

The environmental data acquisition unit 1101b acquires the environmental data (the weather, the temperature, the humidity, the water quality of the makeup water, or the like) in the periphery of the power generating plant 10 as the plant data from the environmental measuring device 111.

The operating data acquisition unit 1101c acquires the operating data (the output of the power generating plant 10, the temperature or the pressure of the boiler, or the like) of the power generating plant 10 as the plant data from the operation monitoring device 112.

The relational storage unit 1102 stores relationships between the circulating water quality index value, the makeup water quality index value, the drainage water quality index value, and environmental data and target values of a concentration rate of the cooling water of the cooling water circulation line 105. The concentration rate is a value obtained by dividing an amount of makeup water by an amount of drainage water. The relational storage unit 1102 stores one or more inference rules. The relational storage unit 1102 stores provisional inference rules determined by an engineer in advance in an initial state. Examples of a format of the inference rule include a format "when the circulating water quality index, value is X1 or more and X2 or less, the makeup water quality index value is Y1 or more and Y2 or less, and the drainage water quality index value is Z1 or more and Z2 or less, the target value of a concentration rate of cooling water is T." Examples of a variable used for a condition of the inference rule include a water quality index value, a change rate of the water quality index value, a statistic of the water quality index value, operating data, a change rate of the operating data, a statistic of the operating data, environmental data, a change rate of the environmental data, and a statistic of the environmental data.

The determining unit 1103 determines the target value of the concentration rate of the cooling water of the cooling water circulation line 105 based on the water quality index values acquired by the water quality index value acquisition unit 1101a, the environmental data acquired by the environmental data acquisition unit 1101b, the operating data acquired by the operating data acquisition unit 1101c, and the inference rule stored in the relational storage unit 1102. To be specific, when the relational storage unit 1102 stores a plurality of inference rules, the determining unit 1103 determines the target value of the concentration rate of the cooling water by obtaining a plurality of inference results based respectively on the inference rules and integrating the inference results. Therefore, the determining unit 1103 can increase accuracy of the target value of the concentration rate. Examples of the inference rule include a neural network, a Bayesian network, a support vector machine, and case-based reasoning. The determining unit 1103 may determine the target value by specifying one inference rule among the plurality of inference rules in addition to determining the target value based on the plurality of inference rules. The determining unit 1103 is realized by an inference engine. In other words, the relational storage unit 1102 and the determining unit 1103 function as an expert system which is an example of artificial intelligence.

The controller 1104 outputs a control instruction to the fourth seed pump 1061, the blowdown valve 1071, and the second chemical injection pump 1082 based on the target value of the concentration rate of the cooling water determined by the determining unit 1103. The concentration rate is the value obtained by dividing the amount of makeup water by the amount of drainage water. The amount of drainage water is specified by multiplying a ratio of a target value of electrical conductivity of cooling water and an actually measured value thereof by the amount of makeup water. Therefore, the controller 1104 can calculate the amount of makeup water and the amount of drainage water based on a concentration rate of the cooling water. Also, an amount of chemical injection is an amount which is proportional to the amount of drainage water. Therefore, the controller 1104 can calculate the amount of chemical injection based on the specified amount of drainage water.

The input unit 1105 receives an input of a target value of the concentration rate of the cooling water from a skilled engineer. The target value is an appropriate target value which is specified by the skilled engineer based on the water quality index values acquired by the water quality index value acquisition unit 1101a, the environmental data acquired by the environmental data acquisition unit 1101b, and the operating data acquired by the operating data acquisition unit 1101c. The skilled engineer specifies the target value of the concentration rate of the cooling water such that the drainage water quality index value does not exceed a predetermined drainage water regulation value, that the circulating water system is not deteriorated due to scale, slime, or corrosion, and that water quality management cost is reduced. The water quality management cost increases as the amount of makeup water, the amount of drainage water, and the amount of chemical injection increase. In this case, the input unit 1105 receives an input of a reason for which the target value is determined from the skilled engineer. Examples of the reason for which the target value is determined include a format "because the circulating water quality index value is X1 or more and the makeup water quality index value is Y1 or more." In other words, the input unit 1105 can receive an input of the same format as a condition part of the inference rule as the reason for which the target value is determined.

The updating unit 1106 generates the inference rule based on the concentration rate and the reason input to the input unit 1105. The updating unit 1106 stores the generated inference rule in the relational storage unit 1102.

Next, an operation of the water quality management device 110 according to this embodiment will be described.

Figure 3:
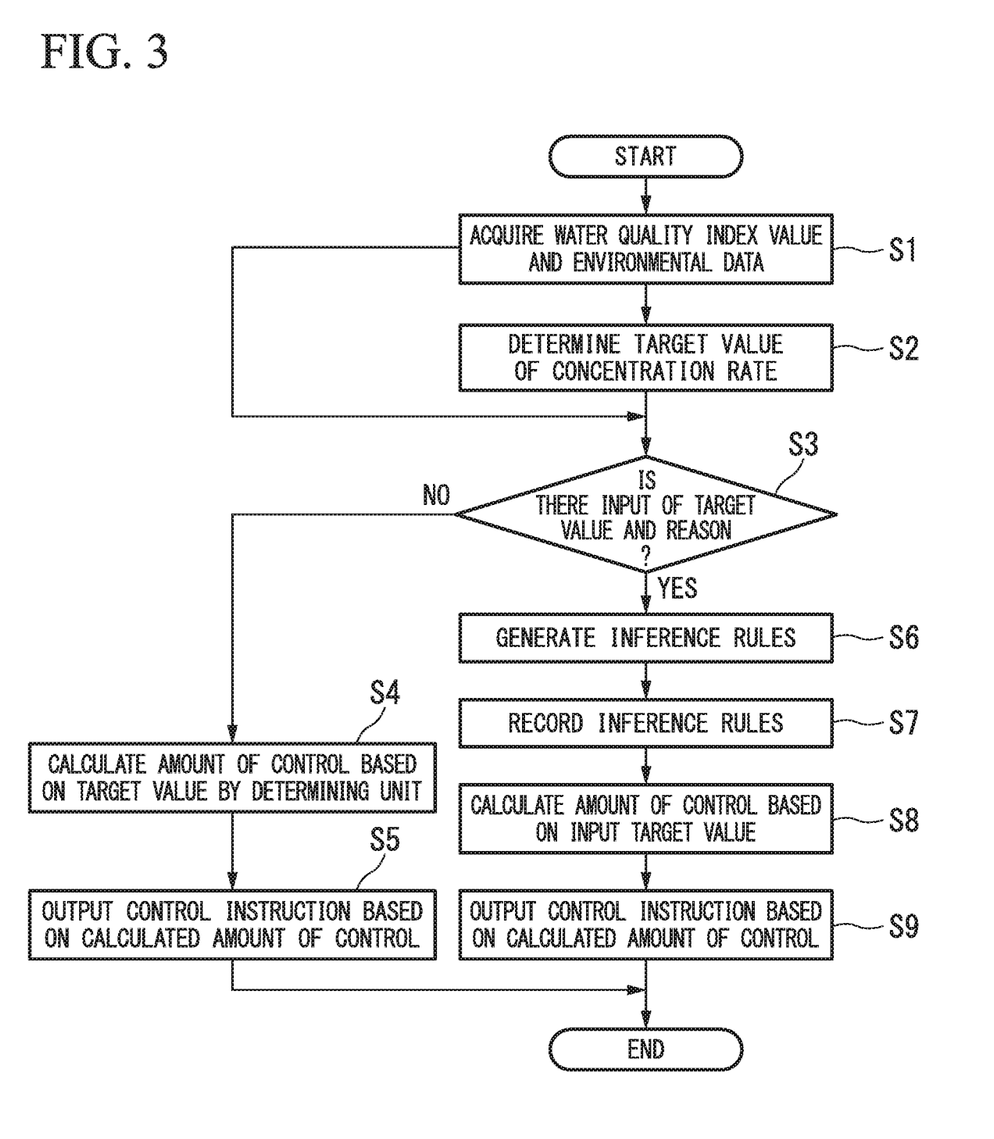
FIG. 3 is a flowchart illustrating an operation of the water quality management device according to the first embodiment.

FIG. 3 is a flowchart illustrating an operation of the water quality management device according to the first embodiment.

When the water quality management device 110 is started, the water quality management device 110 performs the following process at regular time intervals.

The water quality index value acquisition unit 1101a acquires the water quality index values indicating the water quality from the circulating water quality sensor 1052, the makeup water quality sensor 1062, and the drainage water quality sensor 1072. The environmental data acquisition unit 1101b acquires the environmental data from the environmental measuring device 111. Similarly the operating data acquisition unit 1101c acquires the environmental data from the operation monitoring device 112. In other words, the water quality index value acquisition unit 1101a acquires the circulating water quality index value, the makeup water quality index value, and the drainage water quality index value, the environmental data acquisition unit 1101b acquires the environmental data, and the operating data acquisition unit 1101c acquires the operating data (Step S1).

Subsequently, the determining unit 1103 determines the target value of the concentration rate of the cooling water based on the inference rule stored in the relational storage unit 1102 (Step S2). Here, when the target value determined by the determining unit 1103 is different from the determination of the skilled engineer (the target value input by the skilled engineer), the inference rule is sequentially updated using the determination of the engineer (the input target value) as data for learning, through a process of Step S3 and Step S4 which will be described below. Therefore, the learning of the determining unit 1103 in the water quality management device 110 proceeds, and accuracy of the determined target value of the concentration rate of the cooling water is thus increased.

When the determining unit 1103 determines the target value of the concentration rate in Step S2, the updating unit 1106 determines whether the target value of the concentration rate and the reason for which the target value is determined are input to the input unit 1105 from the skilled engineer (Step S3). When the target value of the concentration rate and the reason for which the target value is determined are not input to the input unit 1105 (Step S3: NO), the controller 1104 calculates the amount of makeup water, the amount of drainage water, and the amount of chemical injection based on the target value of the concentration rate determined by the determining unit 1103 in Step S2 (Step S4). Subsequently, the controller 1104 controls the fourth feed pump 1061, the blowdown valve 1071, and the second chemical injection pump 1082 based on the calculated results (Step S5). To be specific, the controller 1104 outputs a control instruction to the fourth feed pump 1061 to supply the calculated amount of makeup water. The controller 1104 outputs a control instruction to the blowdown valve 1071 to drain the calculated amount of drainage water. The controller 1104 outputs a control instruction to the second chemical injection pump 1082 to inject the calculated amount of chemical injection.

On the other hand, when the target value of the concentration rate and the reason for which the target value is determined are input to the input unit 1105 (Step S3: YES), the updating unit 1106 generates the inference rules based on the target value and the reason input to the input unit 1105 (Step S6). Subsequently, the updating unit 1106 stores the generated inference rules in the relational storage unit 1102 (Step S7). As described above, since the inference rules stored by the relational storage unit 1102 are sequentially updated according to the determination of the skilled engineer, the learning of the determining unit 1103 proceeds, and accuracy of the determined target value of the concentration rate of the cooling water is thus increased. The controller 1104 calculates an amount of control of the circulating water system, that is, the amount of makeup water, the amount of drainage water, and the amount of chemical injection based on the target value of the concentration rate of the cooling water input to the input unit 1105 (Step S8). Subsequently, the controller 1104 controls the fourth feed pump 1061, the blowdown valve 1071, and the second chemical injection pump 1082 based on the calculated results (Step S9). To be specific, the controller 1104 outputs a control instruction to the fourth feed pump 1061 to supply the calculated amount of makeup water. The controller 1104 outputs a control instruction to the blowdown valve 1071 to drain the calculated amount of drainage water. The controller 1104 outputs a control instruction to the second chemical injection pump 1082 to inject the calculated amount of chemical injection.

As described above, according to this embodiment, the water quality index value acquisition unit 1101a acquires the water quality index values including the makeup water quality index value indicating the water quality of the makeup water and the circulating water quality index value indicating the water quality of the circulating water. The determining unit determines the concentration rate of the cooling water of the circulating water system based on the water quality index values acquired by the water quality index value acquisition unit 1101a. Thus, the water quality management device 110 can appropriately manage the water quality of the circulating water system even if the water quality of the makeup water is not constant.

According to this embodiment, the relational storage unit 1102 stores the inference rule indicating relationship between the water quality index values and amounts of concentration control. The determining unit 1103 determines the concentration rate based on the water quality index values acquired by the water quality index value acquisition unit 1101a and the relationship stored in the relational storage unit 1102. As described above, the water quality management device 110 can appropriately manage the water treatment system 100 by storing the inference rule for obtaining such a concentration rate that a drainage regulation is satisfied, that the circulating water system is not deteriorated, and that water quality management cost can be suppressed, in the relational storage unit 1102.

According to this embodiment, the input unit 1105 receives the input of the concentration rate of the cooling water which satisfies a predetermined limit value and is specified by the engineer (a professional engineer or an expert) based on the water quality index values acquired by the water quality index value acquisition unit 1101a. Examples of the predetermined limit value include a drainage water regulation value, water quality leading to deterioration of a circulating water system, and water quality management cost. The updating unit 1106 updates the relationship stored in the relational storage unit 1102 based on the concentration rate input to the input unit 1105. Thus, the inference rule for obtaining the concentration rate which satisfies the predetermined limit value is accumulated in the relational storage unit 1102. Therefore, the water quality management device 110 can appropriately manage the water treatment system 100.

Second Embodiment

Figure 4:
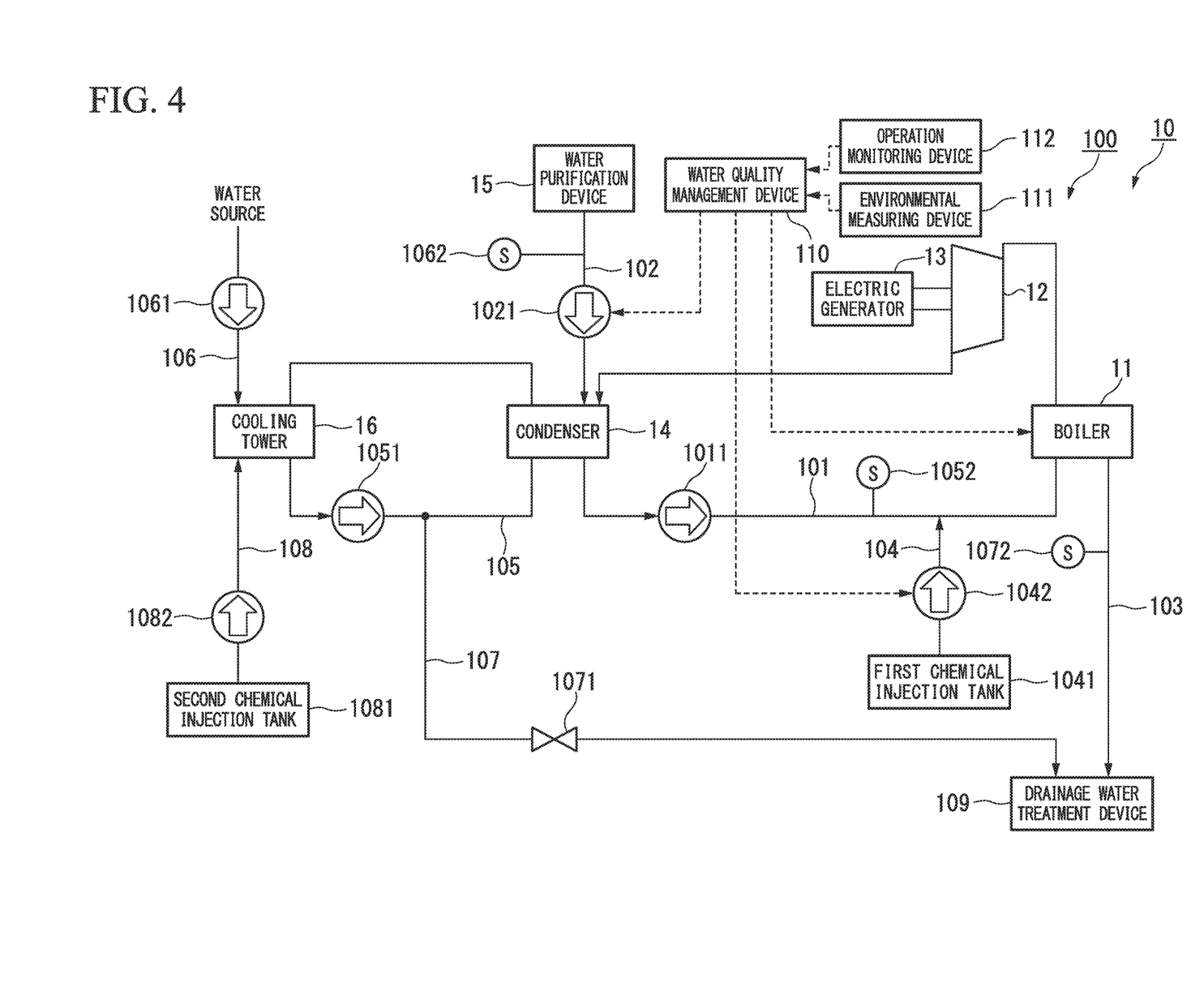
FIG. 4 is a schematic block diagram showing a constitution of a water treatment system according to a second embodiment.

The water quality management device 110 according to the first embodiment manages the water quality of the circulating water system constituted by the cooling water circulation line 105, the second supply line 106, the second drainage line 107, and the second chemical injection line 108. On the other hand, a water quality management device 110 according to a second embodiment manages water quality of a circulating water system constituted by a steam circulation line 101, a first supply line 102, a first drainage line 103, and a first chemical injection line 104.

FIG. 4 is a schematic block diagram showing a constitution of a water treatment system according to the second embodiment.

In a water treatment system 100 according to this embodiment, installation positions of a circulating water quality sensor 1052, a makeup water quality sensor 1062, and a drainage water quality sensor 1072 are different from those of the first embodiment. The circulating water quality sensor 1052 is provided in the steam circulation line 101. The makeup water quality sensor 1062 is provided in the first supply line 102. The drainage water quality sensor 1072 is provided in the first drainage line 103. The water qualify management device 110 according to this embodiment determines power of a second feed pump 1021, an amount of drainage water in a boiler 11, and power of a first chemical injection pump 1042 based on water qualities detected by the circulating water quality sensor 1052, the makeup water quality sensor 1062, and the drainage water quality sensor 1072. An operation of the water quality management device 110 according to this embodiment is the same as that of the first embodiment.

Thus, the water quality management device 110 can appropriately manage the water quality of the circulating water system constituted by the steam circulation line 101, the first supply line 102, the first drainage line 103, and the first chemical injection line 104.

Other Embodiments

Although the embodiments have been described in detail above with reference to the accompanying drawings, the specific constitutions are not limited to the above-described constitutions, and various changes in design, etc. are also possible.

For example, the determining unit 1103 of the water quality management device 110 according to the above-described embodiments calculates the concentration rate, but the present invention is not limited thereto. A determining unit 1103 of another embodiment may calculate another amount of concentration control associated with a concentration rate. Examples of the amount of concentration control include a concentration rate, an amount of water supply, an amount of drainage water, an amount of chemical injection, an opening of a valve, and power of a pump.

The input unit 1105 according to the above-described embodiment receives the input of the reason for which the target value is determined in addition to the target value of the concentration rate of the circulating water, but the present invention is not limited thereto. An input unit 1105 according to another embodiment may not receive an input of a reason for which the target value is determined. In this ease, an updating unit 1106 updates an inference rule based on a target value of a concentration rate of circulating water input to an input unit 1105, water quality index values acquired by a water quality index value acquisition unit 1101a, and environmental data acquired by an environmental data acquisition unit 1101b.

The determining unit 1103 according to the above-described embodiment specifies one inference rule from the plurality of inference rules stored by the relational storage unit 1102 and determines the amount of concentration control based on the specified inference rule, but the present invention is not limited thereto. The determining unit 1103 according to another embodiment may determine the amount of concentration control based on an artificial intelligence technique other than an expert system. For example, the determining unit 1103 according to another embodiment may determine the amount of concentration control using a determination technique based on machine learning. In this case, a relational storage unit 1102 stores a predictive model acquired by machine learning. The predictive model is an example of a relationship between water quality index values and amounts of concentration control. The updating unit 1106 updates the predictive model stored by the relational storage unit 1102 using, as teacher data, a combination of the target value of the concentration rate input to the input unit 1105, the water quality index values acquired by the water quality index value acquisition unit 1101a, the environmental data acquired by the environmental data acquisition unit 1101b, and operating data acquired by an operating data acquisition unit 1101c.

The determining unit 1103 according to the above-described embodiment determines the target value of the concentration rate based on the circulating water quality index value, the makeup water quality index value, and the drainage water quality index value, but the present invention is not limited thereto. The determining unit 1103 according to another embodiment may determine the target value of the concentration rate without using the drainage water quality index value. This is because the circulating water quality index value and the drainage water quality index value are substantially the same. Also, the determining unit 1103 according to another embodiment may determine the target value of the concentration rate using another water quality index value in addition to the circulating water quality index value and the makeup water quality index value.

The water quality management device 110 according to the above-described embodiment includes the controller 1104 which controls the circulating water system, but the present invention is not limited thereto. For example, the water quality management device 110 according to one embodiment may output the concentration rate determined by the determining unit 1103 to the outside, and may not control the circulating water system. For example, the water quality management device 110 may display the target value of the concentration rate determined by the determining unit 1103 or the amount of control of the circulating water system on an external display device. In this case, an operator controls the circulating water system in accordance with the displayed target value of the concentration rate or amount of control.

Figure 5:
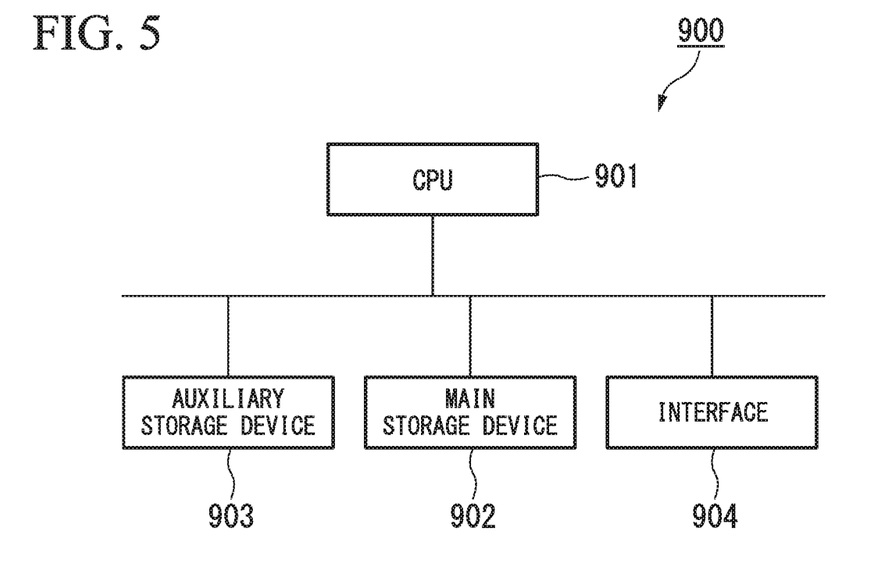
FIG. 5 is a schematic block diagram showing a constitution of a computer according to at least one embodiment.

FIG. 5 is a schematic block diagram showing a constitution of a computer according to at least one embodiment.

A computer 900 includes a central processing unit (CPU) 901, a main storage device 902, an auxiliary storage device 903, and an interface 904.

The above-described water quality management device 110 is mounted on the computer 900. Operations of the above-described processing units are stored in the auxiliary storage device 903 in the form of a program. The CPU 901 reads the program from the auxiliary storage device 903, develops the program on the main storage device 902, and executes the above-described processes in accordance with the program. The CPU 901 forms a storage region corresponding to the above-described relational storage unit 1102 in the main storage device 902 or the auxiliary storage device 903 in accordance with the program.

In at least one embodiment, the auxiliary storage device 903 is an example of computer-readable media. Other examples of the computer-readable media include a magnetic disk, a magneto-optical disc, a compact disc-read only memory (CD-ROM), a digital versatile disc-read only memory (DVD-ROM), a semiconductor memory, and other types of non-transitory tangible media connected through the interface 904. When the program is delivered to the computer 900 through communication lines, the computer 900 which receives the delivered program may develop the program on the main storage device 902 and execute the above-described processes.

The program may be for the purpose of implementing some of the above-described functions. The program may be a so-called differential file (differential program) that implements the above-described functions in combination with other programs which have already been stored in the auxiliary storage device 903.

At least a portion of the above-described water quality management device 110 may be realized by a semiconductor circuit such as an application specific integrated circuit (ASIC).

INDUSTRIAL APPLICABILITY

The water quality management device determines an amount of concentration control based on a makeup water quality index value indicating water quality of makeup water in addition to a circulating water quality index value indicating water quality of circulating water circulating through a circulation line. Thus, the water quality management device can appropriately manage water quality of a circulating water system even if the water quality of the makeup water is not constant.

REFERENCE SIGNS LIST

100 Water treatment system
1011 First feed pump
1021 Second feed pump
1051 Third feed pump
1061 Fourth feed pump
1042 First chemical injection pump
1082 Second chemical injection pump
1071 Blowdown valve
1052 Circulating water quality sensor
1062 Makeup water quality sensor
1072 Drainage water quality sensor
110 Water quality management device
1101 Acquisition unit
1101a Water quality index value acquisition unit
1101b Environmental data acquisition unit
1101c Operating data acquisition unit
1102 Relational storage unit
1103 Determining unit
1104 Controller
1105 Input unit
1106 Updating unit
111 Environmental measuring device
112 Operation monitoring device

The invention claimed is:

1. A water quality management system for managing a circulating water system of a plant which includes a circulation line through which circulating water is circulated, a supply line which supplies makeup water to the circulation line, a discharge line which discharges the circulating water from the circulation line, and a chemical injection line which injects a chemical to the circulation line, the water quality management system comprising: at least one feed pump for supplying water for the circulation water system, at least one valve for draining or blowing down water from the circulating water system, and at least one injection pump for supplying a water treatment chemical to add to the circulating water, and a control system which includes:

a determining unit configured to determine an amount of concentration control, the amount of concentration control being at least one of a concentration rate, an amount of water supply, an amount of drainage water, an amount of chemical injection, an opening of a valve, and power of a pump of the circulating water system;

an acquisition unit configured to acquire plant data on the plant used by the determining unit to determine the amount of concentration control;

a relational storage unit configured to store one or more inference rules concerning a condition of the plant data and a condition of the amount of concentration control when the conditions are satisfied with each other;

an input unit configured to receive an input of an amount of concentration control which satisfies a predetermined limit value and is specified based on the plant data acquired by the acquisition unit;

an updating unit configured to generate a new inference rule based on the amount of concentration control input to the input unit and record the new inference rule at the relational storage unit; and a controller configured to control, based on the amount of concentration control determined by the determining unit, pumping speed or rate of the at least one feed pump, degree of opening of the at least one valve, and amount of chemical to be injected for the at least one injection pump;

wherein the determining unit determines the amount of concentration control based on the plant data acquired by the acquisition unit and the inference rule stored at the relational storage unit.

2. The water quality management system according to claim 1, wherein the acquisition unit includes a water quality index value acquisition unit which acquires water quality index values including a makeup water quality index value indicating water quality of the makeup water and a circulating water quality index value indicating water quality of the circulating water, and the determining unit determines the amount of concentration control based on the water quality index values acquired by the water quality index value acquisition unit.

3. The water quality management system according to claim 2, wherein the water quality index values include a discharge water quality index value indicating water quality of the circulating water discharged from the discharge line.

4. The water quality management system according to claim 1, wherein the acquisition unit includes an environmental data acquisition unit which acquires environmental data of the plant, and the determining unit determines the amount of concentration control based on the environmental data acquired by the environmental data acquisition unit.

5. The water quality management system according to claim 1, wherein the acquisition unit includes an operating data acquisition unit which acquires operating data of the plant, and the determining unit determines the amount of concentration control based on the operating data acquired by the operating data acquisition unit.

6. A water treatment system comprising:
the water quality management system according to claim 1; and
the circulating water system including the circulation line through which the circulating water is circulated, the supply line which supplies the makeup water to the circulation line, the a discharge line which discharges the circulating water from the circulation line, and the chemical injection line which injects the chemical to the circulation line.

7. A water quality management method of a water quality management system for managing of a circulating water system of a plant which includes a circulation line through which circulating water is circulated, a supply line which supplies makeup water to the circulation line, a discharge line which discharges the circulating water from the circulation line, and a chemical injection line which injects a chemical to the circulation line, the water quality management system comprising at least one feed pump for supplying water for the circulation water system, at least one valve for draining or blowing down water from the circulating water system, and at least one injection pump for supplying a water treatment chemical to add to the circulating water, the water quality management method comprising:
an acquisition step of acquiring plant data on the plant;
an input step of receiving an input of an amount of concentration control which satisfies a predetermined limit value and is specified based on the acquired plant data, the amount of concentration control being at least one of a concentration rate, an amount of water supply, an amount of drainage water, an amount of chemical injection, an opening of a valve, and power of a pump of the circulating water system;
an updating step of generating a new inference rule based on the input amount of concentration control and storing the new inference rule at a relational storage unit which stores one or more inference rules concerning a condition of the plant data and a condition of the amount of concentration control when the conditions are satisfied with each other;
a determination step of determining an amount of concentration control based on the plant data acquired in the acquisition step and the inference rule stored at the relational storage unit, and
a control step of controlling, based on the amount of concentration control determined by the determining step, pumping speed or rate of the at least one feed pump, degree of opening of the at least one valve, and amount of chemical to be injected for the at least one injection pump.

8. A water quality management system for managing a circulating water system of a plant which includes a circulation line through which circulating water is circulated, a supply line which supplies makeup water to the circulation line, a discharge line which discharges the circulating water from the circulation line, and a chemical injection line which injects a chemical to the circulation line, the water quality management system comprising: at least one feed pump for supplying water for the circulation water system, at least one valve for draining or blowing down water from the circulating water system, and at least one injection pump for supplying a water treatment chemical to add to the circulating water, and a control system which includes:
a relational storage unit configured to store one or more inference rules concerning plant data and an amount of concentration control, the plant data being a plurality of types of variables related to the plant, and the amount of concentration control being at least one of a concentration rate, an amount of water supply, an amount of drainage water, an amount of chemical injection, an opening of a valve, and power of a pump of the circulating water system;
a determining unit configured to determine an amount of concentration control associated with a concentration rate of the circulating water system based on the plant data and the inference rule;
an input unit configured to receive an input of an amount of concentration control which satisfies a predetermined limit value and is specified based on the plant data;
an updating unit configured to generate a new inference rule based on the amount of concentration control input to the input unit and update the inference rule stored at the relational storage unit with the new inference rule; and
a controller configured to control, based on the amount of concentration control determined by the determining unit, pumping speed or rate of the at least one feed pump, degree of opening of the at least one valve, and amount of chemical to be injected for the at least one injection pump.

* * * * *